United States Patent
Sortur et al.

(10) Patent No.: US 12,499,478 B2
(45) Date of Patent: Dec. 16, 2025

(54) METHOD AND SYSTEM FOR PERFORMING PRODUCT MATCHING ON AN E-COMMERCE PLATFORM

(71) Applicant: Rakuten Asia Pte. Ltd., Singapore (SG)

(72) Inventors: Muralidhar Sortur, Karnataka (IN); Venugopal Rao, Karnataka (IN); Pawan Rajpoot, Karnataka (IN); Subhanandh Tamilarasu, Karnataka (IN); Manjunath Srinivas, Karnataka (IN); Ganji Krishna, Karnataka (IN); Sreevidhya Rajakrishnan, Karnataka (IN)

(73) Assignee: Rakuten Asia Pte. Ltd., Singapore (SG)

( * ) Notice: Subject to any disclaimer, the term of this patent is extended or adjusted under 35 U.S.C. 154(b) by 82 days.

(21) Appl. No.: 17/513,116

(22) Filed: Oct. 28, 2021

(65) Prior Publication Data
US 2023/0139720 A1    May 4, 2023

(51) Int. Cl.
*G06Q 30/00*    (2023.01)
*G06F 18/243*    (2023.01)
(Continued)

(52) U.S. Cl.
CPC .  *G06Q 30/06291* (2025.08); *G06F 18/24323* (2023.01); *G06F 40/295* (2020.01); *G06Q 30/0627* (2013.01); *G06Q 30/0629* (2013.01)

(58) Field of Classification Search
CPC ............ G06Q 30/0627; G06Q 30/0629; G06F 18/24323; G06F 40/295
See application file for complete search history.

(56) References Cited

U.S. PATENT DOCUMENTS 8,086,643 B1 *  12/2011  Tenorio .............. G06Q 10/0875
                                                        706/20
8,577,823 B1 *  11/2013  Gadir ..................... G06N 5/025
                                                        706/45
(Continued)

FOREIGN PATENT DOCUMENTS

JP        5-242254 A    9/1993
JP        2006-18336 A    1/2006
(Continued)

OTHER PUBLICATIONS

"Large scale product search with spatial quantization and deep ranking," by Shuhan Qi, Zawlin Kyaw, Xuan Wang, Zoe L. Jiang, and Jian Guan, Multimedia Tools and Applications, 78: 27045-27065, published online May 1, 2017 (Year: 2017).*

(Continued)

*Primary Examiner* — Anne M Georgalas
(74) *Attorney, Agent, or Firm* — Sughrue Mion, PLLC

(57) ABSTRACT

An apparatus for performing product matching may include: a processor configured to receive a search as product item for searching for a catalog product that matches a target product; classify the target product in a product taxonomy tree including a plurality of taxonomy nodes, by identifying a taxonomy node to which the target product belongs, among the taxonomy nodes; obtain product data associated with the target product from an internal source and an external source and measure data quality; extract attributes from the product data based on a machine learning model; validate the attribute in response to the attribute corresponding to defined mandatory attribute of the taxonomy node to which the target product belongs, and provide a search result based on the validated attributes; re-rank searched results governed by relevancy score and display matched set of (Continued)

products to the customer above defined re-rank confidence score.

6 Claims, 12 Drawing Sheets

(51) Int. Cl.
*G06F 40/295* (2020.01)
*G06Q 30/0601* (2023.01)

(56) References Cited

U.S. PATENT DOCUMENTS

| | | | |
|---|---|---|---|
| 9,378,277 B1 * | 6/2016 | Nguyen | G06F 16/2452 |
| 9,460,190 B1 * | 10/2016 | Hein | G06F 16/285 |
| 10,740,660 B2 * | 8/2020 | Bhardwaj | G06Q 30/0631 |
| 11,037,071 B1 * | 6/2021 | Tekiela | G06V 10/764 |
| 11,263,756 B2 * | 3/2022 | Chidlovskii | G06N 20/20 |
| 2007/0019864 A1 | 1/2007 | Koyama et al. | |
| 2008/0115080 A1 * | 5/2008 | Matulic | G06F 16/5846 707/E17.022 |
| 2008/0215349 A1 * | 9/2008 | Baran | G06Q 30/0641 705/1.1 |
| 2010/0191769 A1 | 7/2010 | Koyama et al. | |
| 2015/0106156 A1 * | 4/2015 | Chang | G06Q 30/0201 705/7.29 |
| 2018/0174219 A1 * | 6/2018 | Jadhav | G06Q 50/01 |
| 2020/0143570 A1 * | 5/2020 | Guido-Clark | G06T 7/90 |
| 2021/0073266 A1 | 3/2021 | Nakagawa | |
| 2021/0248656 A1 * | 8/2021 | Makowsky | G06Q 30/0621 |
| 2022/0207587 A1 * | 6/2022 | Yang | G06V 40/10 |

FOREIGN PATENT DOCUMENTS

| | | |
|---|---|---|
| JP | 2007-26386 A | 2/2007 |
| JP | 2021-39682 A | 3/2021 |
| WO | 2018/070026 A1 | 4/2018 |

OTHER PUBLICATIONS

"Optimizing the Catalog Search Process for E-Procurement Platforms," by Sven Döring, Stefan Fischer, Werner Kießling, and Timotheus Preisinger, Proceedings of the 2005 International Workshop on Data Engineering Issues in E-Commerce, 2005 (Year: 2005).*

Japanese Office Action issued Jan. 16, 2024 in Application No. 2022-171407.

* cited by examiner

FIG. 1

FIG. 9
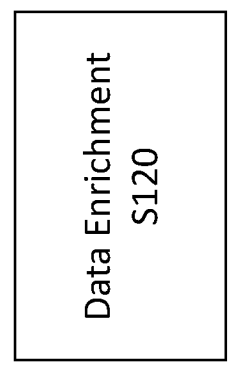
- Image attributes
- Text attributes
- Taxonomy
- Attribute dictionary
- Brands/synonyms

METHOD AND SYSTEM FOR PERFORMING PRODUCT MATCHING ON AN E-COMMERCE PLATFORM

FIELD

Methods, apparatuses, and systems consistent with example embodiments relate to product matching in an electronic-commerce (e-commerce) environment using machine learning algorithms, and more particularly, to matching a target product with a catalog product on an e-commerce platform.

BACKGROUND

In e-commerce systems, product matching is one of the key tasks in various use cases such as (1) competitive pricing of products, (2) deduplication of products in a catalog, and (3) grouping products from various merchants.

For product matching, a corresponding product is searched from a product catalog in which attributes and categories of millions of products are classified through a taxonomy tree having tens of thousands of taxonomy nodes. While there are complex models to solve the problem of identifying duplicate products in a catalog, such complex models require high resources or are not scalable, and thus may not achieve a required accuracy consistently.

SUMMARY

One or more example embodiments provide a method, an apparatus, and a system for classifying e-commerce products using a taxonomy tree with a high accuracy.

Further, one or more example embodiments provide deep learning models and a scalable architecture to classify e-commerce items with a high accuracy.

Still further, one or more example embodiments provide a method and a system for (1) identifying attributes qualifying for a taxonomy node; (2) classifying products; (3) enriching text and image attributes; (4) searching for a target product with regard to multiple indices and filtering results based on mandatory attributes; and (5) re-ranking search results to improve relevance of short listed results.

According to an aspect of an example embodiment, there is provided an apparatus for performing product matching, the apparatus including: a memory storing instructions; and a processor configured to execute the instructions to: receive a search query for searching for a catalog product that matches a target product; classify the target product in a product taxonomy tree including a plurality of taxonomy nodes, by identifying a taxonomy node to which the target product belongs, among the taxonomy nodes; obtain product data associated with the target product from an internal source and an external source; extract attributes from the product data based on category-specific (L1) attribute extraction Machine Learning Model; validate the attributes in response to the attributes corresponding to mandatory attributes defined on the taxonomy node to which the target product belongs; and provide a search result based on the validated attribute.

The processor may be further configured to: invalidate the attribute in response to the attribute not corresponding to any mandatory attribute of the taxonomy node to which the target product belongs, so that the search result is not provided based on the invalidated attribute.

The memory may be configured to store the product taxonomy tree, and an attribute dictionary that includes mandatory attribute information for each of the plurality of taxonomy nodes. The processor may be further configured to validate the attribute based on the product taxonomy tree and the attribute dictionary.

The processor may be further configured to: obtain an image as the product data associated with the target product; and extract image features from the image, as the attribute extracted from the product data, based on an image segmentation process and a color extraction process.

The image segmentation process may include: segmenting the image into a plurality of portions; and identifying a portion corresponding to the target product from the plurality of portions.

The color extraction process may include: extracting colors from the portion of the image corresponding to the target product; clustering the extracted colors based on RGB values of the extracted colors; and storing a cluster of the extracted colors as the image attribute.

The processor may be further configured to: obtain text as the product data associated with the target product; and extract a text attribute from the text, as the attribute extracted from the product data, based on an annotation process and a name entity recognition (NER) process.

The annotation process may include: annotating the text based on a seed dictionary definition-based labeling method and a rule-based labeling method.

The NER process may include: extracting a product listing title from the product data, based on an NER machine learning model that is trained using synthetic sentence templates.

The processor may be further configured to: obtain text data and image data as the product data associated with the target product; extract a plurality text attributes and a plurality of image features from the text data and the image data, respectively; conduct a search based on the plurality text attributes and the plurality of image features in a text data search space and an image data search space, in parallel; obtain a plurality of candidate search results from the search; identify one or more search results which have the mandatory attributes, among the plurality of candidate search results; and provide the identified one or more search results, as the search result based on the validated attribute.

According to an aspect of an example embodiment, there is provided a method for performing product matching, the method including: receiving a search query for searching for catalog products that matches a target product; classifying the target product in a product taxonomy tree including a plurality of taxonomy nodes, by identifying a taxonomy node to which the target product belongs, among the taxonomy nodes; obtaining product data associated with the target product from an internal source and an external source; extracting an attribute from the product data based on an attribute extraction machine learning model; validating the attribute in response to the attribute corresponding to defined mandatory attributes of the taxonomy node to which the target product belongs; and providing a search result based on the validated attribute.

The method may further include: invalidating the attribute in response to the attribute not corresponding to any mandatory attribute of the taxonomy node to which the target product belongs, so that the search result is not provided based on the invalidated attribute.

The validating the attribute may include: validating the attribute based on the product taxonomy tree and an attribute dictionary that includes mandatory attribute information for each of the plurality of taxonomy nodes.

The method may further include: obtaining an image as the product data associated with the target product; and extracting an image attribute from the image, as the attribute extracted from the product data, based on an image segmentation process and a color extraction process.

The image segmentation process may include: segmenting the image into a plurality of portions; and identifying a portion corresponding to the target product from the plurality of portions.

The color extraction process may include: extracting colors from the portion of the image corresponding to the target product; clustering the extracted colors based on RGB values of the extracted colors; and storing a cluster of the extracted colors as the image attribute.

The method may further include: obtaining text as the product data associated with the target product; and extracting a text attribute from the text, as the attribute extracted from the product data, based on an annotation process and a named-entity recognition (NER) process.

The annotation process may include: annotating the text based on a seed dictionary definition-based labeling method and a rule-based labeling method.

The NER process may include: extracting a product listing title from the product data, based on an NER machine learning model that is trained using synthetic sentence templates.

The method may further include: obtaining text data and image data as the product data associated with the target product; extracting a plurality text attributes and a plurality of image attributes from the text data and the image data, respectively; conducting a search based on the plurality text attributes and the plurality of image attributes in a text data search space and an image data search space, in parallel; obtaining a plurality of candidate search results from the search; identifying one or more search results which have the at least one mandatory attribute, among the plurality of candidate search results; and providing the identified one or more search results, as the search result based on the validated attribute.

According to an aspect of the disclosure, While the afore described methods, devices, and non-transitory computer-readable mediums have been described individually, these descriptions are not intended to suggest any limitation as to the scope of use or functionality thereof. Indeed these methods, devices, and non-transitory computer-readable mediums may be combined in other aspects of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 1 is a product listing on an e-commerce platform according to an example embodiment of the present disclosure;

FIG. 9 illustrates a data enrichment process according to an example of the present disclosure;

DETAILED DESCRIPTION

Figure 2:
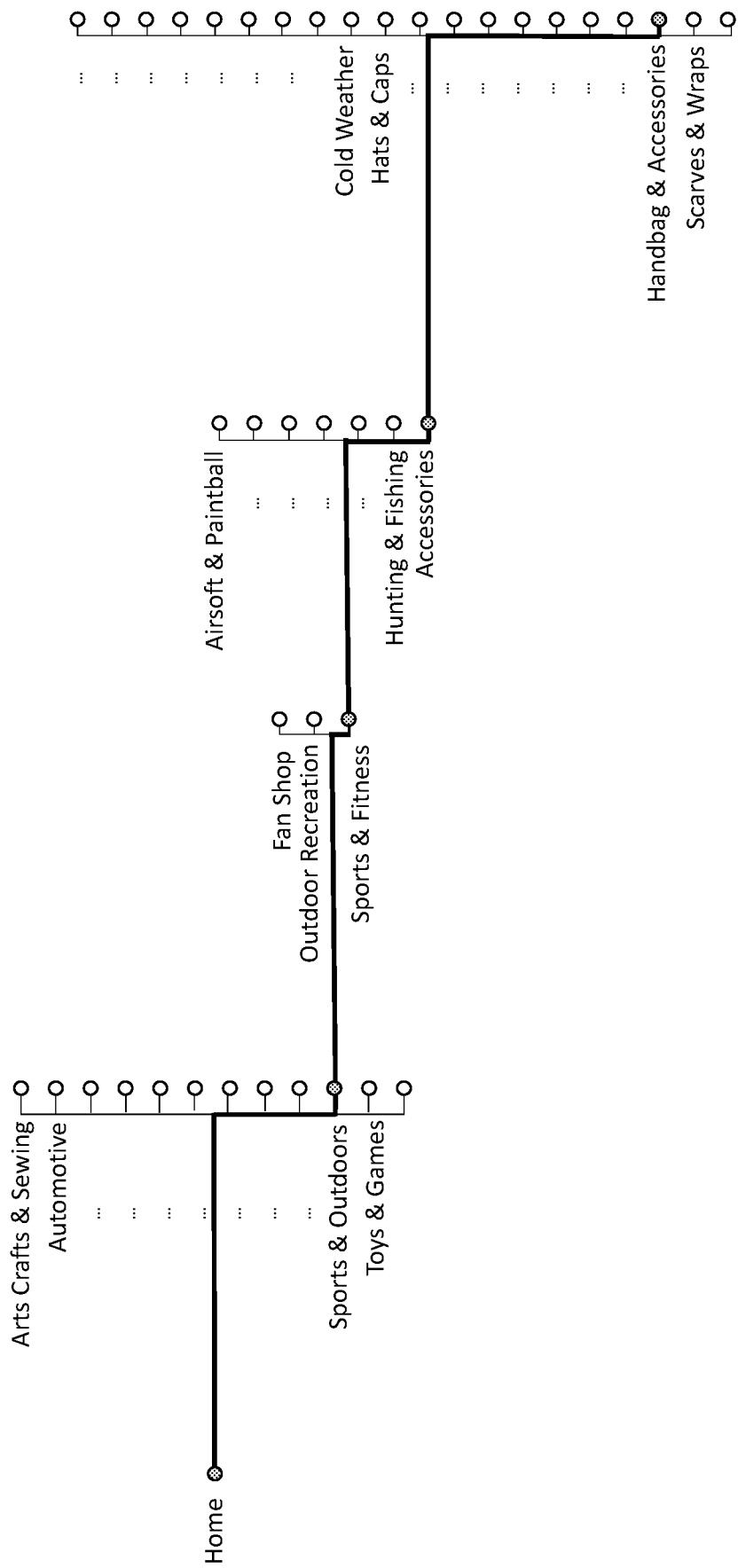
FIG. 2 is a diagram illustrating a product taxonomy according to an example embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Throughout the disclosure, expressions such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

While such terms as "first," "second," etc., may be used to describe various elements, such elements must not be limited to the above terms. The above terms may be used only to distinguish one element from another.

Figure 1:
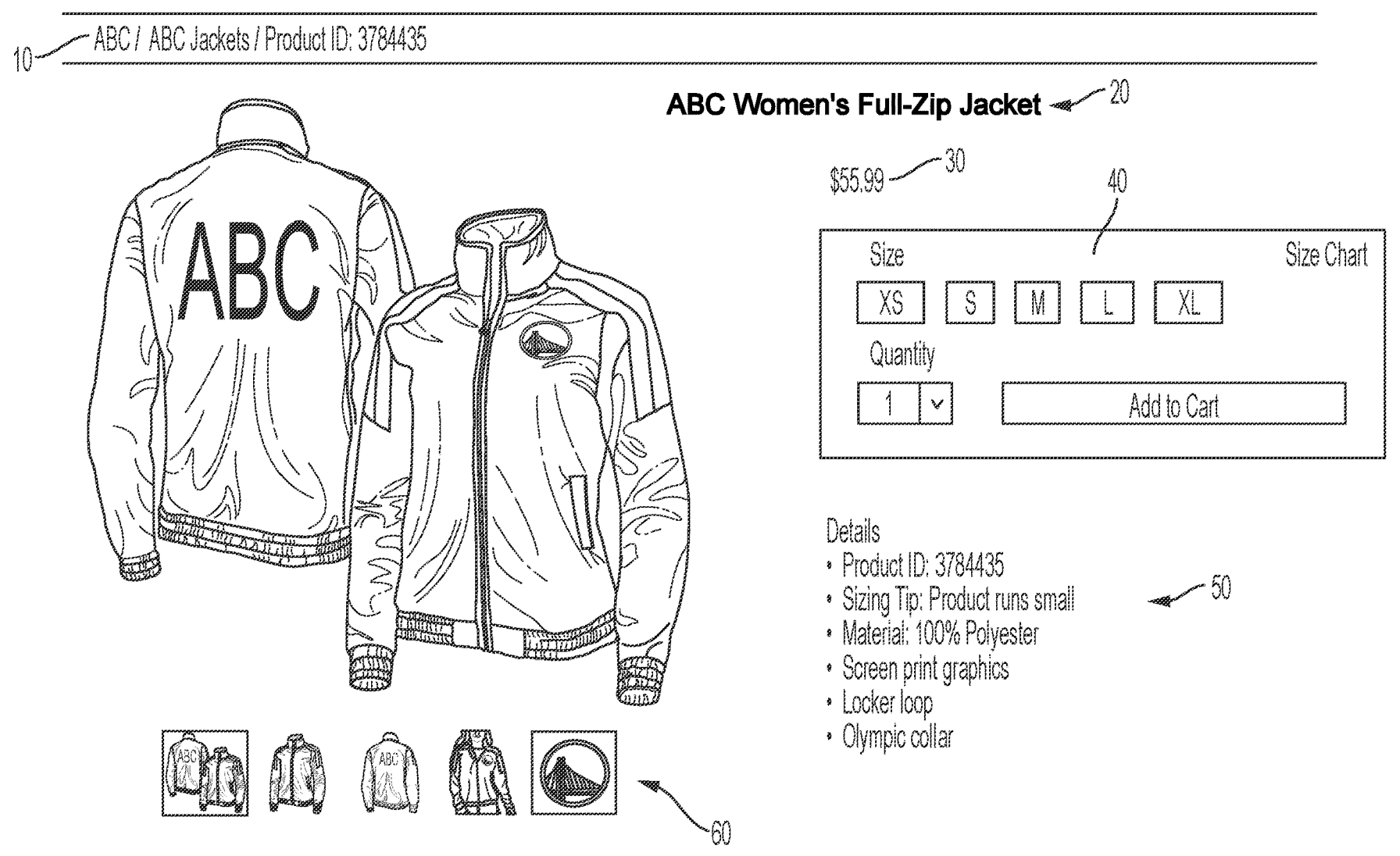

FIG. 1 is a product listing on an e-commerce platform according to an example embodiment of the present disclosure.

As shown in FIG. 1, a product listing on an e-commerce platform according to an example embodiment may include a taxonomy 10, a title 20, a price 30, an optical selector, such as a size selector 40, a product description 50, and product images 60.

The e-commerce platform receives products from numerous merchants, and a product matching system according to an example embodiment organizes all these information of the products in a standardized and systematic manner for accurate product matching, as discussed below. The e-commerce platform may recognize a product that is being browsed in its system, to search for a catalog product that matches the product being browsed.

FIG. 2 is a diagram illustrating a product taxonomy in accordance with an example embodiment of the present disclosure.

A product matching system according to an example embodiment may store a product taxonomy that organizes and classifies various products into categories, based on attributes of the products.

A taxonomy tree has a plurality of taxonomy nodes (e.g., total 3,3000 nodes) that are connected via edges, and each taxonomy node has its own level (e.g., level 1 to level 29), wherein the level of a node n refers to the number of edges on the path from the root node to the node n. Each taxonomy node may have mandatory product attributes (e.g., brand, gender, color, material, etc.) defined to qualify for a given product.

For example, as shown in FIG. 2, the root node corresponding to "Home" category at level 1 has a plurality of children nodes at level 2, including a node corresponding to "sports & outdoors" category. The "sports & outdoors" category is classified into "fan shop" category, "outdoor recreation" category, and "sports & fitness category," at level 3, and the "sports & fitness" category at level 3 is classified into a plurality of sub categories, including "accessories" category at level 4. The "accessories" category at level 4 is further classified into a plurality of sub categories including "handbag & accessories" category at level 5. In this manner, when a certain search query is input, a target product may be classified to be mapped to the "home" category at level 1, the "sports & outdoors" category" at level 2, the "sports & fitness" category at level 3, the accessories" category at level 4, and the "handbag & accessories" at level 5.

The product matching system use machine learning algorithms (e.g., a deep learning model) to perform product matching, specifically, to classify the product in the taxonomy tree, according to the attributes of the product. Through machine learning algorithms, a certain product is mapped to a certain node in the taxonomy tree.

The attributes of the product may be classified into the following three types: (1) set values; (2) range of values; and (3) unbounded values. The set values may refer to attribute values that are drawn from a finite set, such as attribute values of materials (e.g., cotton, denim, muslin, voile, brocade, chiffon, etc.). The range of values may refer to attribute values having a lower limit and an upper limit, such as attribute values for size, weight, volume, memory, bandwidth, and the like. Examples of the unbounded values may include color, given that there are a countless number of different names of color.

The product matching system may validate attributes having set values based on an attribute dictionary, and may validate attributes having ranges of values based on a predefined pattern or range. For the attributes having unbounded values, the product matching system may map each color value of a product into RGB values to identify a matching color and pattern.

The product matching system may use product data quality for a given product at a given product taxonomy as a function of mandatory attribute keys at a given taxonomy node. When the product data quality is higher than a data quality threshold, the product data is determined to have valid attribute values.

An e-commerce product is characterized by a set of relevant attributes which is a measure of data quality. For every product category, a fixed set of attributes exists, and the product matching system may measure the data quality at each and every stage across the product matching pipeline.

When N is a set of attributes that are essential for characterizing a product completely, and M is a set of attributes that have been identified across different stages of the product matching pipeline, the data quality for a given product, for a given category is defined as:

$$\frac{|N \cap M|}{|N|}$$

The data quality is zero if N and M are disjoint and is equal to 1 if N and M are identical.

The product matching system may measure the data quality at a plurality of different phases in the product matching pipeline process, for example, at the phases of defining a product taxonomy tree and product attributes, classifying products in the product taxonomy tree, extracting and enriching product attributes, searching and filtering based on multiple types of indices (e.g., text index, image index, and vector index), and re-ranking search results to improve relevance of matching products. The plurality of different phases will be described in detail hereinafter.

Figure 3:
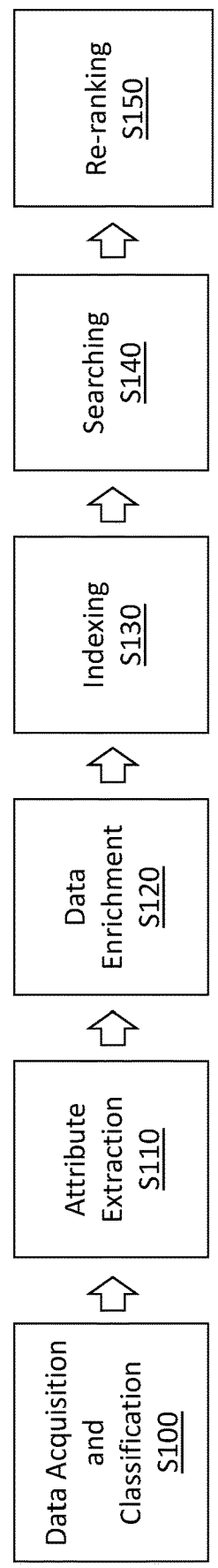
FIG. 3 illustrates a product matching process according to an example embodiment of the present disclosure.

FIG. 3 illustrates a product matching process according to an example embodiment of the present disclosure.

As shown in FIG. 3, the product matching process may include a data acquisition and classification process S100, an attribute extraction process S110, a data enrichment process S120, an indexing process S130, a searching process S140, and a re-ranking process S150.

The product matching process may include a step of recognizing a target product that is being browsed in an e-commerce system, and generating a search query corresponding to the target product.

In the data acquisition and classification process S100, when a text search query (e.g., text search query of "ABC jacket") is input to search for a target product, corresponding product data is collected from a plurality of different sources, including an internal database and publicly available websites, for example, a brand's official website, and other e-commerce websites.

For example, when the product data is collected from another e-commerce website listing the target product, the product data may include taxonomy information of the target product (e.g., "ABC/ABC JACKETS/PRODUCT ID:3784435"), a title of the target product (e.g., "Women's ABC Full-Zip Jacket"), a price of the target product (e.g., $55.99), and a size selector of the target product (e.g., "medium size"), a description of the target product (e.g., "product ID: 3784435," "Material: 100% polyester," "Olympic collar"), and images of the target product.

The text search query and the product data are input a machine learning model to output the classification of the target product. For product classification, the machine learning model may use a fastText based text classification model, to classify the target product in the taxonomy tree. According to the classification of the target product that is determined in the data acquisition and classification process S100, a particular attribute extraction model may be selected in the attribute extraction process S110.

In the attribute extraction process S110, attributes are extracted from the collected product data. For example, when the product data includes taxonomy information of the target product (e.g., "ABC/ABC JACKETS/PRODUCT ID:3784435"), a title of the target product (e.g., "Women's ABC Full-Zip Jacket"), a price of the target product (e.g., $55.99), and a size selector of the target product (e.g., "medium size"), a description of the target product (e.g., "product ID: 3784435," "Material: 100% polyester," "Olympic collar"), and an image of the target product, attributes may be extracted from the taxonomy information, the title, the price, the size selector, the description of the target product, and the image of the target product.

In order to extract an image feature, a color, and a size from the image of the target product, the image is input to a machine learning model for image feature detection, a machine learning model for image segmentation and RGB value extraction, and a machine learning model for image feature extraction, to extract the attributes corresponding to the image feature, the color, and the size, respectively, from the image of the target product.

In the attribute extraction process S110, the types of the extracted attributes may be determined, among the "set value" type, the "range of values" type, and the "unbounded value" type. The attribute extraction process S110 will be described in further detail with reference to FIGS. 4-8.

In the data enrichment process S120, additional attributes relevant to the extracted attributes may be obtained based on a machine learning model that uses fastText classification. For example, an annotated sentence of "White(color) long (length) green (color) shirt (top: type)" may be obtained from a sentence of "White long green shirt" and a category of "fashion-tops" through data enrichment.

In the data enrichment process S120, additional attributes may be obtained using features extracted from an image of the target product. For example, when the image includes a woman wearing a blazer and jeans, the image may be segmented to a first part corresponding to the face of the woman, a second part corresponding to the blazer, a third part corresponding to the jean, a fourth part corresponding to the left hand of the woman, and a fifth part corresponding to the right hand of the woman. Each part of the image may be labeled with a name of the part (e.g., face, blazer, jean, hand, and hand), and a RGB color value representing the part. The data enrichment process S120 will be described in further detail with reference to FIG. 9.

Through processes S100-S120, the product matching system may obtain a sufficient number of attributes per product to achieve an accurate product matching result. Given that there may be millions of products, the product matching system may need to identify what to index and how to build an index in the index process S130, for the accurate product matching result.

The indexing process S130 may include a text indexing process, an image indexing process, and a video indexing process, which will be described in further detail with reference to FIG. 10.

In the searching process S140, one or more searches are conducted depending on the number of indexes (e.g., text similarity and image) for a given set of incoming attributes. Each search may provide a N number of results, wherein N is a natural number. The searching process S140 will be further described with reference to FIG. 11.

In the re-ranking process S150, search results may be re-ranked based on a confidence score in the context of a given set of attributes, so that a search result having the highest confidence score is selected from the plural search results. Specific use case filters and constraints may be applied to choose an appropriate matching product.

Figure 4:
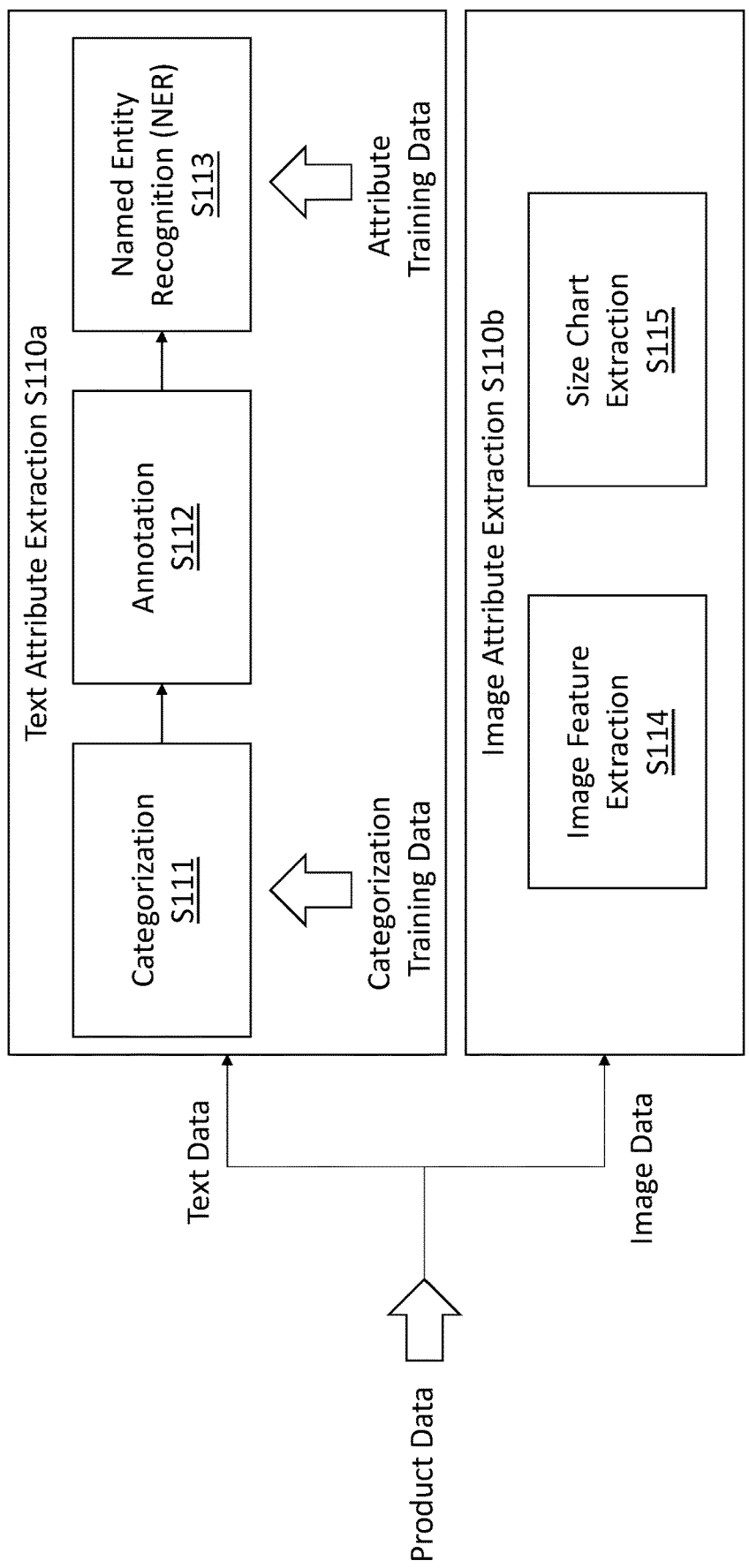
FIG. 4 illustrates an attribute extraction process according to an example of the present disclosure.

FIG. 4 illustrates an attribute extraction process according to an example of the present disclosure.

The attribute extraction process S110 may include a text attribute extraction process S110a for processing text data, an image attribute extraction process S110b for processing image data, and/or a vector attribute extraction process for processing video data, according to the type of the product data (e.g., text data, image data, and video data).

In a case where the product data is text data, the text attribute extraction S110a is performed through a categorization process S111, an annotation process S112, and a named entity recognition (NER) process S113.

In particular, the categorization process S111 is performed using a machine learning model (hereinafter, referred to as "categorization machine learning model") that is trained using categorization training data. The categorization training data may include an attribute dictionary, that stores or retrieves a key value dictionary (e.g., a product identification (ID) number), a brand dictionary (e.g., Nike, Puma, Adidas, etc.), a size chart (e.g., extra-small, small, medium, large, and extra-large), a color dictionary (e.g., RBG values and corresponding names of colors).

For example, when text "Women's Full-Zip Jacket" and "medium size" are obtained as the target product data, from a website displaying the title and the size selector of the target product, the text is input to the categorization machine learning model, and one or more categories (e.g., a jacket category, a medium size category) of the product data are output from the categorization machine learning model.

In the annotation process S112, the product data in text form is annotated based on the following types of labeling functions: labeling based on a regular expression method, labeling based on a seed dictionary definition, and labeling based on a set of rules.

According to the regular expression method, a keyword (e.g., "neck") is set up using a combination of an asterisk and the keyword (e.g., "*neck"), so that any word followed by the keyword is labeled as a data type associated with the keyword (e.g., "neck" type data).

The seed dictionary definition may contain a set of key value pairs (e.g., "red, color" as a (key, value) pair). When the text product data of "red" is input, a corresponding value "color" may be added to create the key value pair of "red, color." The key value pair may be stored in a knowledge base of the product matching system.

A set of rules (e.g., "if . . . else" relations) may be applied to annotate the text product data. An entity type of certain text data may be determined as type A if the text data is not followed by or preceded by a preset change triggering word, but the entity type may change to type B if the text data is followed by or preceded by the preset change triggering word. For example, if the text data "leather" is obtained from a title of shoe category data, the data may be recognized as a material type of the shoe, but if "leather" is followed by or preceded by "insole," then the entity type may change to an insole type.

Figure 5:
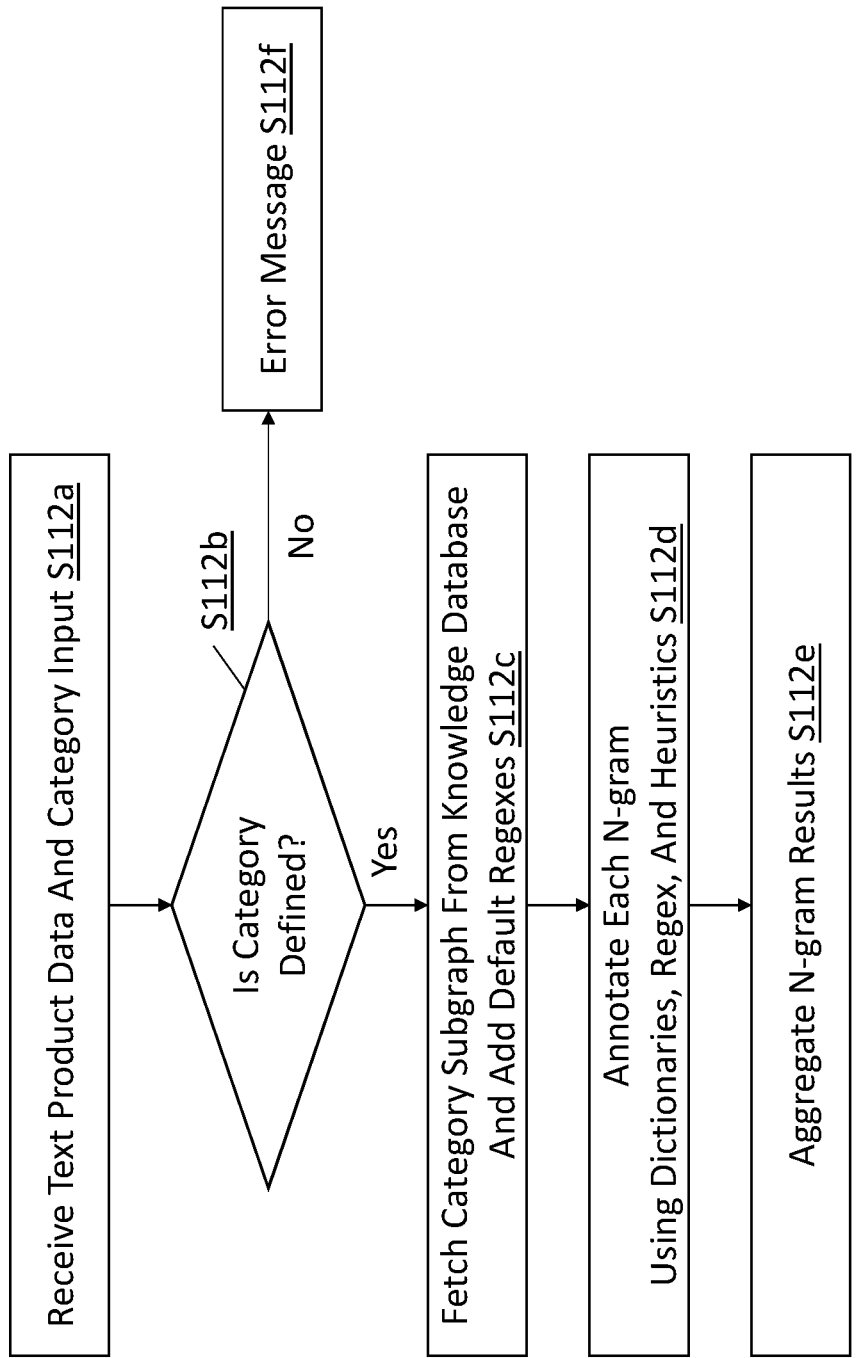
FIG. 5 is a flowchart illustrates an annotation process according to an example embodiment of the present disclosure.

FIG. 5 is a flowchart illustrates the annotation process S112 according to an example embodiment of the present disclosure.

In operation S112a, a text input of the product data (e.g., a sentence "while long green shirt") and information of a category (e.g., "fashion-tops") of the product data, are received.

In operation S112b, it is determined whether the category of the product data is predefined in a knowledge base of a product matching system according to an example embodiment. If the category of the product data is not predefined, an error message is output in operation S112f.

Based on the determination that the category of the product data is predefined in the knowledge base of the product matching system, a category subgraph is fetched from the knowledge base, and default regular expressions (regexes) are added, in operation S112C.

In operation S112d, the text input is split into n-grams, and each n-gram is annotated using the attribute dictionary (for example, including the key value dictionary, the brand dictionary, the size chart, and the color dictionary).

In operation S112e, annotated n-grams are aggregated to provide as an annotation result, to be used in the NER process S113.

Referring back to FIG. 4, the NER process S113 is performed to extract specific attributes from the text product data (e.g., text data obtained from the "title" and the "description" of the target product), using one or more NER machine learning models.

Attributes identified by the NER machine learning models may be validated based on the attribute dictionary to ensure that valid attributes are identified through the NER process S113 per category.

Valid attributes identified through the NER process S113 flow downstream into the system, while invalid attributes are blocked from flowing towards the downstream system. The validation process will be further described with reference to FIGS. 7 and 8.

In a case where the product data is image data, the image attribute extraction process S110b is executed to extract image features and a size chart from the image data.

The image attribute extraction process S110b may include an image feature extraction process S114 for extracting RGB values from an acquired image, and a size chart extraction process S115 for extracting a size chart or a selected size from the acquired image.

Figure 6:
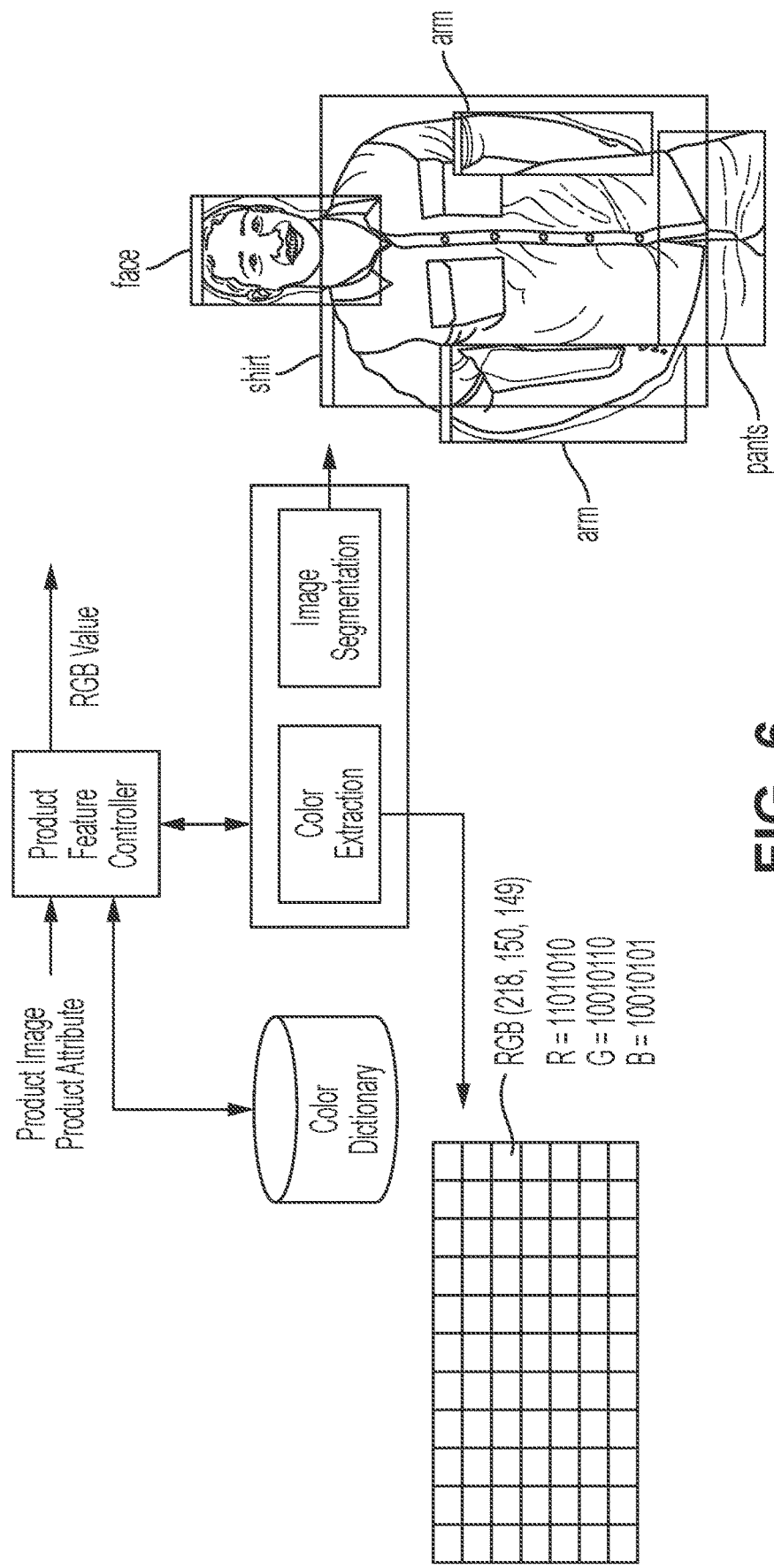
FIG. 6 illustrates an image attribute extraction process according to an example of the present disclosure.

With reference to FIG. 6, the image feature extraction process S114 may use a product feature controller and a color dictionary to extract image features.

As shown in FIG. 6, the product feature controller may receive a product image and attributes corresponding to the product image. The product feature controller may segment the product image, extract colors from a plurality of pixels of the product image, and cluster the colors according to RGB values of the colors.

In the process of the image segmentation, when the product image includes, for example, a man wearing a shirt and pants, the product image may be segmented to a first part corresponding to the face of the man, a second part corresponding to the shirt, a third part corresponding to the pans, a fourth part corresponding to the left arm of the man, and a fifth part corresponding to the right arm of the man. Each part of the product image may be labeled with a name of the part (e.g., face, shirt, pants, (left) arm, and (right) arm). Also, each part of the product image may be labeled with a RGB color value representing the part, through the color extraction process.

More specifically, in the process of the color extraction, the product feature controller may refer to a color dictionary to find color names or a color identification numbers corresponding to the RGB value of each part of the product image, or the RGB value of the part corresponding to the target product (e.g., the part labeled with the shirt, when the search query includes a keyword "shirt"). The product feature controller may output the RGB values, and/or the color names or the color identification numbers corresponding to the RGB values. As such, the product feature controller may identify pixel regions in which a target product (e.g., the shirt) is located, and may extract color information (e.g., the RGB value, the color name, or the color identification number) from the pixel regions in which the target product is located.

Figure 7:
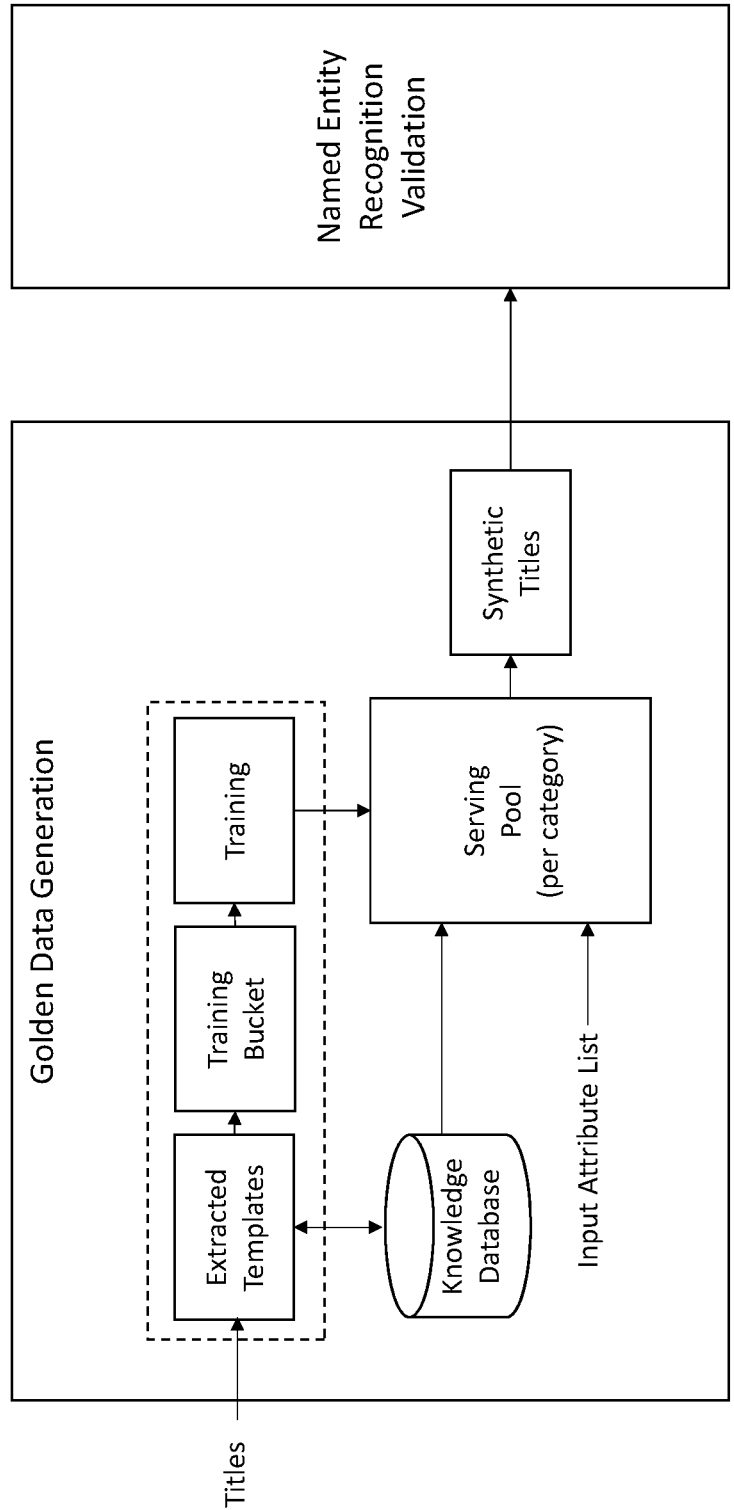
FIG. 7 illustrates a Name Entity Recognition (NER) validation operation according to an example embodiment of the present disclosure.

FIG. 7 illustrates an NER validation operation according to an example embodiment of the present disclosure.

For the validation of the NER process S113 described with reference to FIG. 4, an automated validation pipeline tests an NER model that executes the NER process S113, by using synthetic sentence templates. The synthetic sentence templates are created by Neural Machine Translation based pipeline which is trained using attribute keys as a source and synthetic title templates as a target. The synthetic sentence templates are filled with random values from a knowledge graph to create run time test sentences.

As shown in FIG. 7, when a title of the target product (e.g., a title "Women's ABC Full-Zip Jacket" provided on an e-commerce website for a target product) is input, synthetic sentence templates are created from the title, referring to a knowledge base. The synthetic sentence templates are stored in a training bucket for training, and then are updated for each training cycle. The input title is converted to a synthetic title by using the result of the training, an attributes list, and the knowledge base. The NER process S113 may be validated based on the synthetic title.

Figure 8:
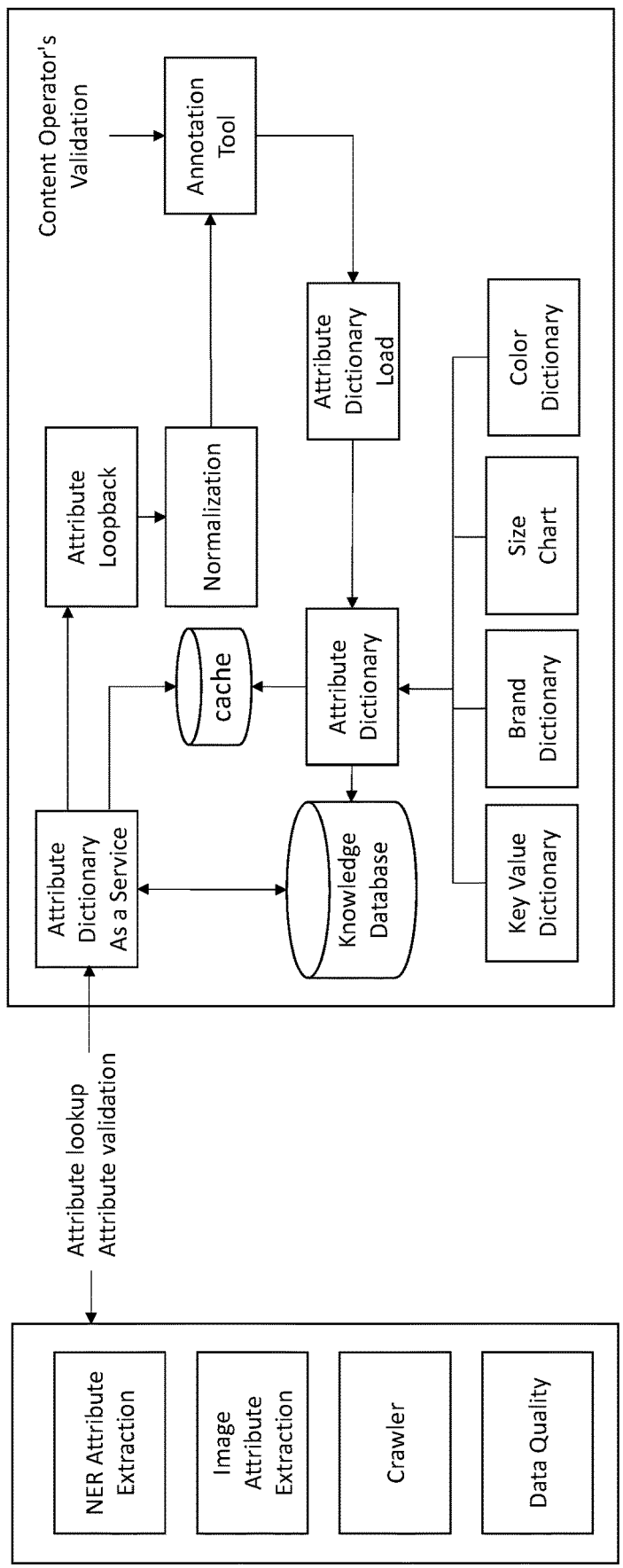
FIG. 8 illustrates an attribute validation operation according to an example of the present disclosure.

FIG. 8 illustrates an attribute validation operation according to an example of the present disclosure.

Attributes identified by the NER process S113 are validated by an attribute dictionary to ensure that valid attributes are identified by NER per category. The attribute dictionary may include or have access to a key value dictionary, a brand dictionary, a size chart, and a color dictionary.

The product matching system may determine whether the attributes identified by NER are defined in the attribute dictionary (or the knowledge base that is formed based on the attribute dictionary). If the attributes identified by NER are defined in the attribute dictionary, the product matching system may determine that the identified attributes are valid.

The valid attributes identified by NER flows downstream into the system, while the invalid attributes are blocked from flowing towards the downstream system and they are collected in a separated database. The invalid attributes collected in the database are examined by an operator through an annotation tool to check if the collected invalid attributes are indeed invalid.

If there are valid attributes, the valid attributes flow back as a feedback which enhances the attribute dictionary with additional valid entries leading to a better and richer attribute dictionary over time. All the valid attributes pass through a normalization module which normalizes the attributes in terms of metrics, standard names, and the like. For example, an attribute "bright red" is normalized to "red", an attribute "4 GB and 1 TB" is normalized to "4 GB and 1000 GB," respectively. This normalization module is a clustering based Deep Learning model serving category agnostic.

FIG. 9 illustrates the data enrichment process S120 according to an example of the present disclosure.

In the data enrichment process S120, text attributes and image attributes are obtained through the attribute extraction process S110, and taxonomy node information (e.g., "Home>Sports & Outdoors>Sports & Fitness>Accessories>Handbag & Accessories" for a target product, as shown in FIG. 2) is obtained from the taxonomy tree. Also, an attribute dictionary, a brand dictionary (e.g., a dictionary storing brand names, for example, such as Nike, Puma, Adidas, etc.), and a synonym dictionary that are stored in the product matching system may be retrieved in the data enrichment process S120.

The text attributes, the image attributes, the taxonomy, and information included in the attribute dictionary, the brand dictionary, and the synonym dictionary are collected as data to be indexed in operation S130.

Figure 10:
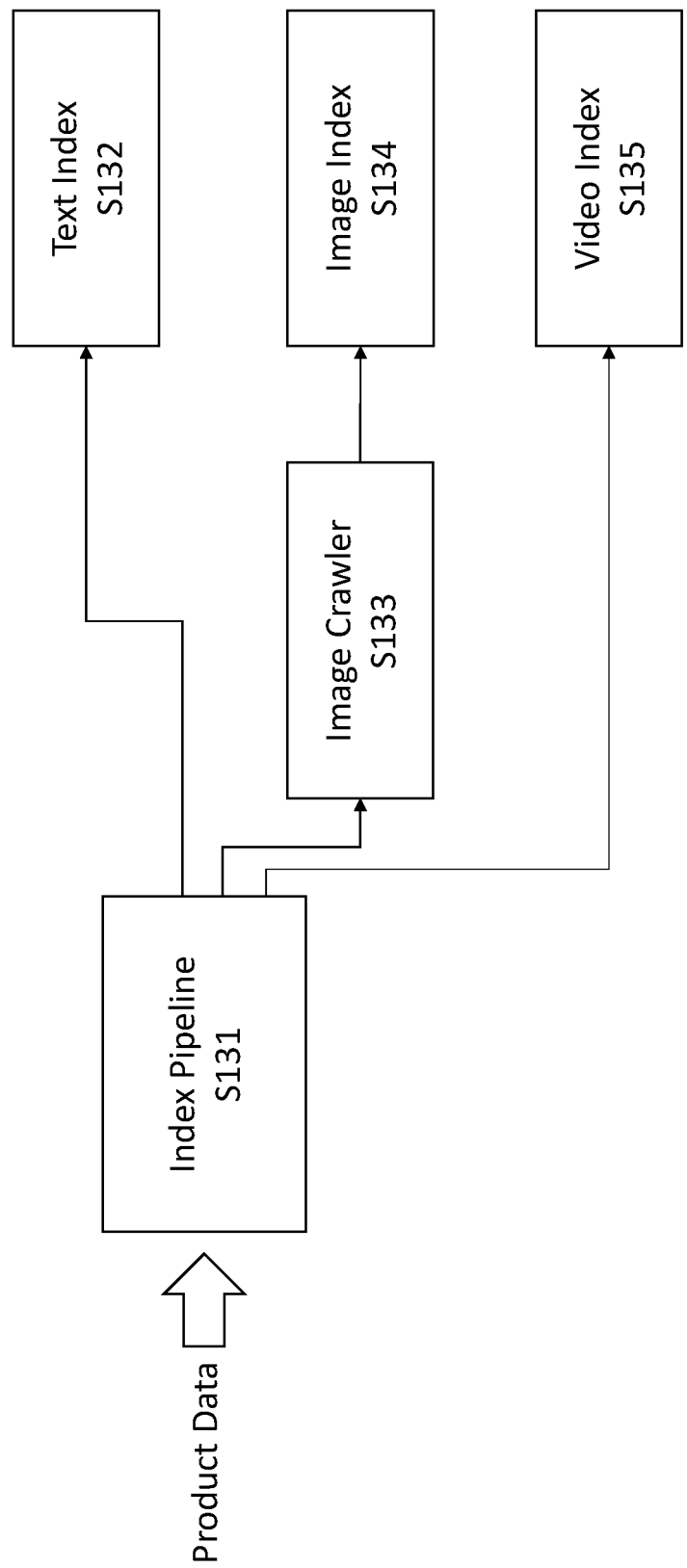
FIG. 10 illustrate a process of indexing product data according to an example embodiment of the present disclosure.

FIG. 10 illustrates a process of indexing product data according to an example embodiment of the present disclosure.

In order to identify that two products are the same, a product matching system according to an example embodiment collect as much as overlap in product data, for example, using a tool that crawls text fields, images, and metadata from e-commerce web pages, and may store the collected data as features.

In operation S131, the product data is fed to an index pipeline to identify the type of the product data, among a text data type, an image index type, and a video index type.

When the product data is text, text-based indexing is perform to generate embedding or text-based features corresponding to the text data (e.g., the product's name, the product's brand, and the product description provided on e-commerce web pages) to find a product which semantically matches the text data in operation S132.

When the product data is an image, web images available on the Internet may be collected and grouped in operation S133 and image-based indexing is performed along with meta data in the form of attributes in operation S134. Each acquired image may be converted into embedding or image-based features using a trained neural network model.

When the product data is a video, vector-based indexing may be performed to generate embedding or video-based features corresponding to the video data in operation S135. In another example, operation S135 may be omitted to reduce computing load.

Figure 11:
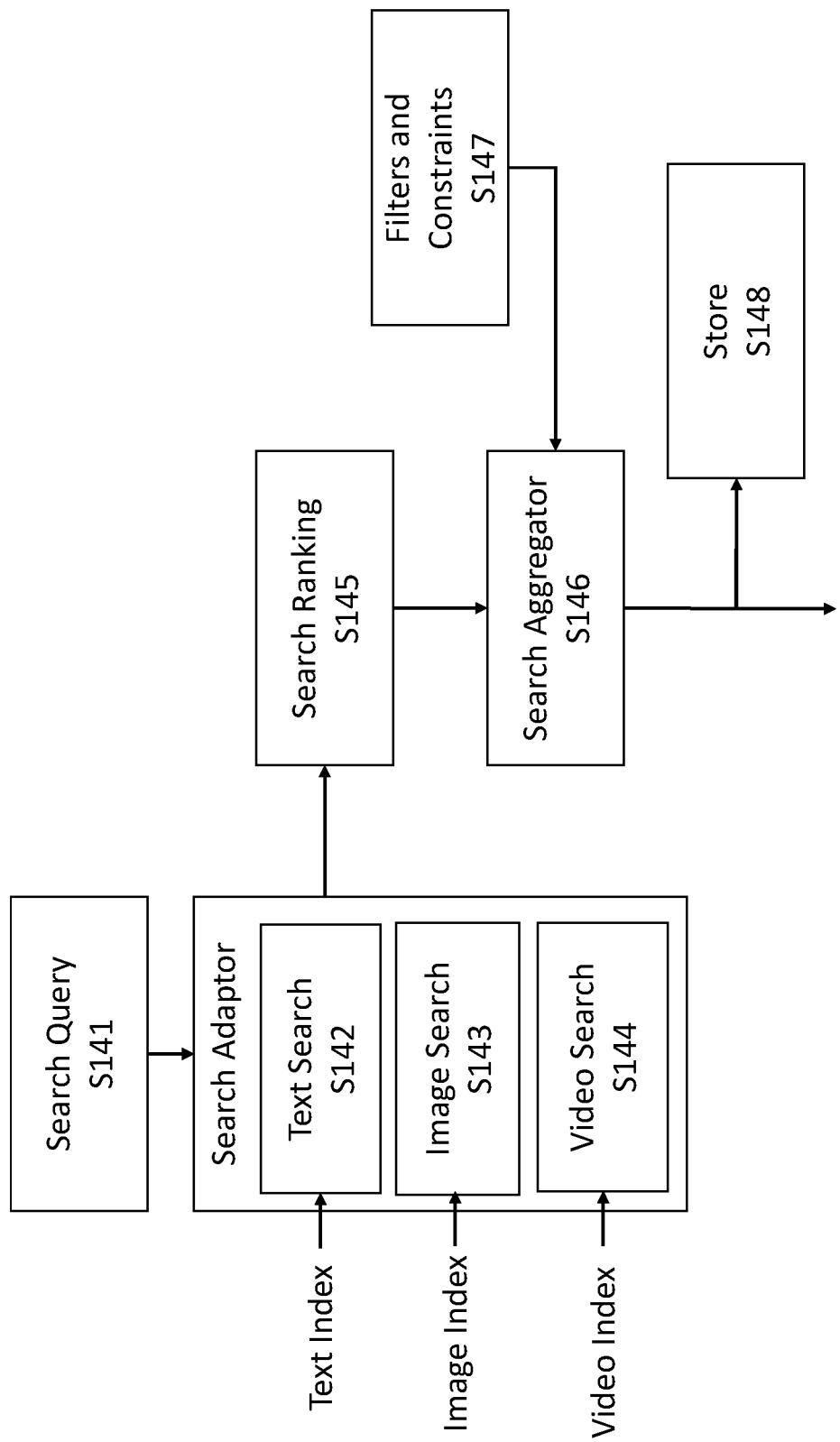
FIG. 11 illustrates a search process and a re-ranking process according to an example embodiment of the present disclosure.

FIG. 11 illustrates a search process and a re-ranking process according to an example embodiment of the present disclosure.

A product matching system according to an embodiment of the present disclosure provides different search spaces for text data and image data.

For searching, a normalized text content (e.g., classification, title, brand, mandatory attributes, and optional attributes) is extracted from product data, and embedding corresponding to the normalized text content is generated. Also, images and metadata (e.g., classification, brand, etc.) may be extracted from the product data.

Based on the embedding corresponding to the normalized text content, the images, and the metadata, a text index and an image index are obtained as described above with reference to operation S130. Also, when video data is collected, a corresponding video index may be obtained.

Upon receiving a search query for searching a catalog for a target product in operation S141, a product search is conducted based on the text index, the image index, and the video index to obtain a plurality of search results showing a plurality of candidate matching products, in operations S142, S143, and S144.

For example, each of the text index, the image index, and the video index may have a data format of (classification, title, brand, mandatory attributes, optional attributes), as follows:

Text Index (classification, title, brand, mandatory attributes, optional attribute)
Image Index (classification, title, brand, mandatory attributes, optional attribute)
Video Index (classification, title, brand, mandatory attributes, optional attribute)

The product matching system may store information about whether a certain attribute is mandatory or optional. Also, the text index, the image index, and the video index may be stored in the format shown above.

The plurality of search results are ranked based on a similarity between the candidate matching products and the target product in operation S145. For a vector search, the product matching system may use an artificial intelligence (AI) similarity search scheme to find a similar product for each matching request.

The plurality of search results are aggregated in operation S146, based on application of preset filters and constraints in operation S147, and are stored in a local storage or an external storage of the product matching system in operations S148.

For example, in operation S147, the preset filters and constraints may allow only the search results associated with mandatory attributes ("set value") to pass through, and to be used in the next operation. In particular, the preset filters and constraints are applied to the aggregated search results to filter out search results having optical attributes and thereby to obtain search results having mandatory attributes ("set-of-values"), based on a definition of each taxonomy node. If attributes of a candidate matching product do not contain mandatory attributes of a classification (or a taxonomy node) which the target product belongs to, the candidate matching product is determined to be noise. Accordingly, the filtering may provide the advantage of reducing noise in product matching results.

Figure 12:
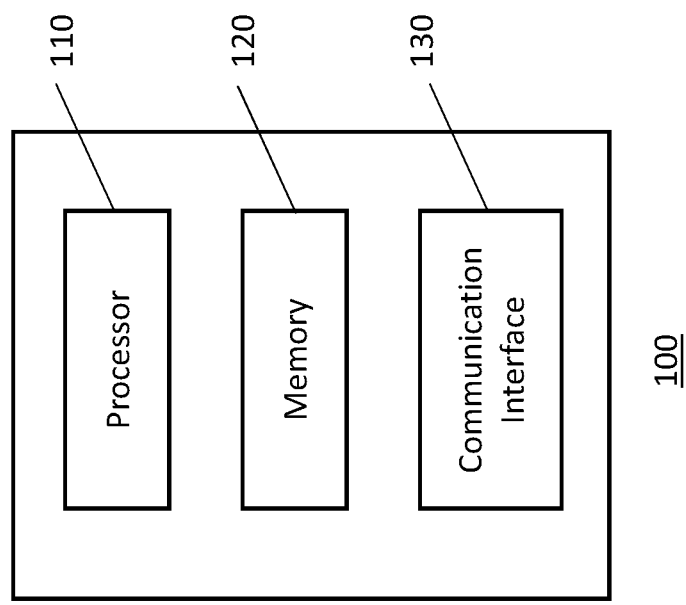
FIG. 12 illustrates a structure of a product matching system having an e-commerce platform according to an example embodiment of the present disclosure.

FIG. 12 illustrates a structure of a product matching system having an e-commerce platform according to an example embodiment of the present disclosure.

As shown in FIG. 12, a product matching system 100 may include a processor 110, a memory 120, and a communication interface 130. The product matching system 100 may be an e-commerce server.

The processor 110 is implemented in hardware, firmware, or a combination of hardware and software. The processor may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor includes one or more processors capable of being programmed to perform a function. The processor may access the memory 120 and execute computer readable program instructions that are stored in the memory 120.

In particular, the processor 110 may perform the data acquisition and classification process S100, the attribute extraction process S110, the data enrichment process S120, the indexing process S130, the searching process S140, and the re-ranking process S150, which are described above with reference to FIGS. 3-11.

The processor 110 may retrieve, from the memory 120, the taxonomy tree (see FIG. 2) and the above-mentioned machine learning models, to classify the target product in the taxonomy tree and to match the target product with a catalog item.

For example, the processor 110 may retrieve a fastText classification model, an image feature detection model, a segmentation and RGB value model, an image feature extraction model, a fastText classification model, a clustering model, and a FastText and bidirectional encoder representations from transformers (BERT) Similarity Model from the memory 120, to execute the operations of the product classification, the image feature extraction, the color attribute extraction, the size extraction, the attribute enrichment, the attribute validation, and the re-ranking, respectively, as shown in Table 1 below.

TABLE 1

Product Matching Machine Learning Models

| Stage | Machine Learning Model |
|---|---|
| Product Classification | FastText Classification Model |
| Image Feature Extraction | Image Feature Detection Model |
| Color Attribute Extraction | Segmentation and RGB Value Model |
| Size Extraction | Image Feature Extraction Model |
| Attribute Enrichment | FastText Classification Model |
| Attribute Validation | Clustering Model |
| Re-Ranking | FastText and BERT Similarity Model |

The memory 120 stores information, data, an operating system, a plurality of program modules software related to the operation and use of the trajectory estimating system. For example, the memory may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The memory 120 may store neural network parameters (e.g., weights, biases, network topologies, network connection information, etc.) for the above-mentioned machine learning models, and may store program instructions and codes configured to be executed by the processor 110 for the data acquisition and classification process S100, the attribute extraction process S110, the data enrichment process S120, the indexing process S130, the searching process S140.

The memory 120 may also store the taxonomy tree, the extracted image and text attributes, the attribute dictionary (including the key value dictionary, the brand dictionary, the size chart, and the color dictionary), the knowledge base, the enriched attributes, the text index, the image index, and the video index of the target product.

In addition, the memory 120 may store one or more mandatory attribute for each taxonomy node, corresponding to each product classification, so that the processor 110 may filter candidate products based on mandatory attributes as defined by product definition for a given taxonomy node.

The communication interface 130 may enable the server 100 to receive a search query from a user and provide a corresponding search result to the user via an Internet network. Additionally, the communication interface 130 may enable the server 100 to collect product data from publicly available sources such as other e-commerce websites. The communication interface 130 may include a transceiver and/or a separate receiver and transmitter that enables the server 100 to communicate with other devices, such as via a wired connection, a wireless connection, or a combination of wired and wireless connections. The communication interface 130 may permit the server 100 to receive information from another device and/or provide information to another device. For example, the communication interface 130 may include an Ethernet interface, an optical interface, a coaxial interface, an infrared interface, a radio frequency (RF) interface, a universal serial bus (USB) interface, a Wi-Fi interface, a cellular network interface, or the like.

According to the example embodiments of the present disclosure, e-commerce products are classified using a taxonomy tree with high accuracy.

According to the example embodiments, the operations of (1) identifying attributes qualifying for taxonomy node; (2) classifying products; (3) enriching text and image attributes; (4) searching for a target product across multiple indices and filtering results based on mandatory attributes; and (5) re-ranking filtered results with a confidence score, are performed to improve relevance of short-listed results, and product data quality is measured at every stage to improve overall performance of product matching.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus for performing product matching, the apparatus comprising:
a memory storing instructions; and
a processor configured to execute the instructions to:
receive information of a target product in an e-commerce system;
classify the target product in a product taxonomy tree including a plurality of taxonomy nodes, by identifying a taxonomy node to which the target product belongs, among the taxonomy nodes;
obtain product data associated with the target product from an internal source and an external source, the product data including an image associated with the target product;
extract image and text attributes from the product data based on image extraction and text extraction, wherein the image extraction comprises image segmentation and color extraction process to identify, as the image attributes, colors of a plurality of segmented portions corresponding to the target product in the image, and wherein the text extraction comprises
receiving a text input of the product data,
obtaining an annotation result of the text input,
automatically generating synthetic title templates using a neural machine translation (NMT)-based pipeline, wherein the NMT-based pipeline is configured to identify attribute keys from the text input as input, and output the synthetic title templates that are filled with random values, inputting the annotation result to a machine learning model to obtain the text attributes as outputs of the machine learning model, the machine learning model being trained on an attribute dictionary storing product identification numbers, brand information, color information, and size information, wherein the machine learning model is trained by validating the outputs of the machine learning model based on the synthetic title templates;

measure a product data quality of the extracted image and text attributes based on a ratio between a number of the extracted image and text attributes, and a number of common features that belong to both the extracted image and text attributes and mandatory attributes, by identifying the mandatory attributes from the taxonomy node to which the target product belongs, among predetermined mandatory attributes;

validate a first set of image and text attributes, among the extracted image and text attributes, in response to the product data quality of the first set of image and text attributes being greater than or equal to a data quality threshold, and the first set of image and text attributes output by the machine learning model matching the attribute dictionary;

provide the validated first set of image and text attributes for further processing including a search;

invalidate a second set of image and text attributes, among the extracted image and text attributes, in response to the product data quality of the second set of image and text attributes being less than the data quality threshold, and the second set of image and text attributes output by the machine learning model not matching the attribute dictionary;

block the invalidated second set of image and text attributes for the further processing, and store the invalidated second set of image and text attributes in a separate database for inspection;

conduct the search of a product catalog based on the validated first set of image and text attributes without using the invalidated second set of image and text attributes; and provide a user interface that shows results of the search based on the validated first set of image and text attributes without using the invalidated second set of image and text attributes, wherein the predetermined mandatory attributes are stored in the memory.

2. The apparatus of claim 1, wherein the processor is further configured to:

extract image features and red (R), green (G), and blue (B) values (RGB color values) from the image, as the image attributes extracted from the product data, based on the image segmentation and color extraction process.

3. The apparatus of claim 1, wherein the image segmentation and color extraction process comprises:

identifying the colors from the plurality of segmented portions of the image corresponding to the target product;

clustering the identified colors based on red, green, and blue values of the identified colors; and storing a cluster of the identified colors as the image features.

4. A method for performing, by at least one computer, the following steps:

receiving a target product in an e-commerce system;

classifying the target product in a product taxonomy tree including a plurality of taxonomy nodes, by identifying a taxonomy node to which the target product belongs, among the taxonomy nodes;

obtaining product data associated with the target product from an internal source and an external source, the product data including an image associated with the target product;

extracting image and text attributes from the product data based on image extraction and text extraction, wherein the extracting the image attributes comprises performing image segmentation and color extraction process to identify, as the image attributes, colors of a plurality of segmented portions corresponding to the target product in the image, and wherein the text extraction comprises receiving a text input of the product data, obtaining an annotation result of the text input, automatically generating synthetic title templates using a neural machine translation (NMT)-based pipeline, wherein the NMT-based pipeline is configured to identify attribute keys from the text input as input, and output the synthetic title templates that are filled with random values, and inputting the annotation result to a machine learning model to obtain the text attributes as outputs of the machine learning model, the machine learning model being trained on an attribute dictionary storing product identification numbers, brand information, color information, and size information, wherein the machine learning model is trained by validating the outputs of the machine learning model based on the synthetic title templates;

measuring a product data quality of the extracted image and text attributes based on a ratio between a number of the extracted image and text attributes, and a number of common features that belong to both the extracted image and text attributes and mandatory attributes, by identifying the mandatory attributes from the taxonomy node to which the target product belongs, among predetermined mandatory attributes;

validating a first set of image and text attributes, among the extracted image and text attributes, in response to the product data quality of the first set of image and text attributes being greater than or equal to a data quality threshold, and the first set of image and text attributes output by the machine learning model matching the attribute dictionary;

providing the validated first set of image and text attributes for further processing including a search;

invalidating a second set of image and text attributes, among the extracted image and text attributes, in response to the product data quality of the second set of image and text attributes being less than the data quality threshold, and the second set of image and text attributes output by the machine learning model not matching the attribute dictionary;

block the invalidated second set of image and text attributes for the further processing, and store the invalidated second set of image and text attributes in a separate database for inspection;

conducting a search of a product catalog based on the validated first set of image and text attributes without using the invalidated second set of image and text attributes; and providing a user interface that shows results of the search based on the validated first set of image and text attributes, without using the invalidated second set of image and text attributes, wherein the predetermined mandatory attributes are stored in a memory.

5. The method of claim 4, further comprising:

extract image features and red (R), green (G), and blue (B) values (RGB color values) from the image, as the image attributes extracted from the product data, based on the image segmentation and color extraction process.

6. The method of claim 4, wherein the color extraction process comprises:

identifying colors as red (R), green (G), and blue (B) values (RGB color values) from the plurality of segmented portions of the image corresponding to the target product;

clustering the extracted colors based on the RGB color values of the identified colors; and storing a cluster of the identified colors as the image features.

\* \* \* \* \*